United States Patent [19]
Rowley

[11] 3,791,871
[45] Feb. 12, 1974

[54] ELECTROCHEMICAL CELL

[75] Inventor: Leroy S. Rowley, San Jose, Calif.

[73] Assignee: Lockheed Aircraft Corporation, Burbank, Calif.

[22] Filed: Apr. 14, 1971

[21] Appl. No.: 133,833

[52] U.S. Cl. .......................................... 136/100 R
[51] Int. Cl. ........................................ H01m 13/00
[58] Field of Search. 136/100 R, 100 M, 86 A, 194, 136/83, 83 T

[56] References Cited
UNITED STATES PATENTS

| | | | |
|---|---|---|---|
| 267,319 | 11/1882 | Berstein | 136/100 R |
| 3,554,810 | 1/1971 | Zaromb | 136/86 A |
| 2,921,110 | 1/1960 | Crowley et al. | 136/100 R |

FOREIGN PATENTS OR APPLICATIONS

| | | | |
|---|---|---|---|
| 524,077 | 4/1956 | Canada | 136/154 |

*Primary Examiner*—Allen B. Curtis
*Attorney, Agent, or Firm*—Paul F. Morgan; George C. Sullivan

[57] ABSTRACT

The effective generation of electrical power is provided utilizing materials which are both chemically and electrochemically highly reactive with one another, in particular, alkali metals and water. The transport of water molecules to the alkali metal anode surface is restricted in the electrolyte. In a simple single stage cell an alkali metal hydroxide aqueous solution electrolyte is provided between an alkali metal anode and a non-reactive metal cathode at a sufficiently high concentration to prevent melting of the anode or thermal runaway. No other chemical or mechanical intermediary is required. Electrical power is obtained by continuously adding to the electrolyte during operation a controlled restricted quantity of water proportional to the electrical current withdrawn from the cell. No external heating is required and the cell operates near room temperature. The control of the rate of water addition may be used to control the power output of the cell.

15 Claims, 8 Drawing Figures

PATENTED FEB 12 1974 3,791,871
SHEET 1 OF 3
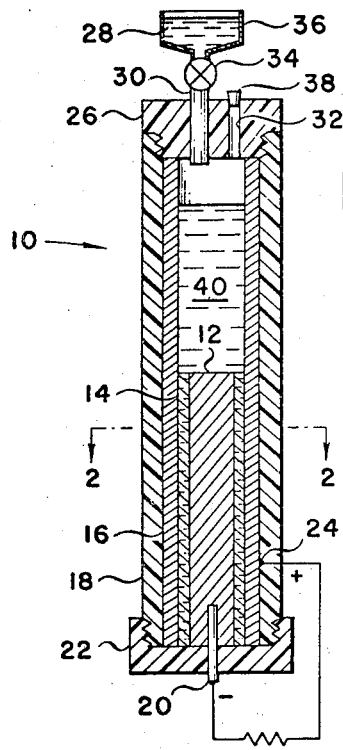
Fig. 1
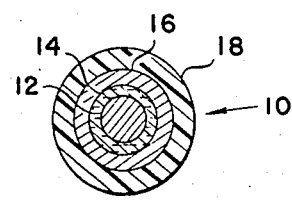
Fig. 2
Fig. 4
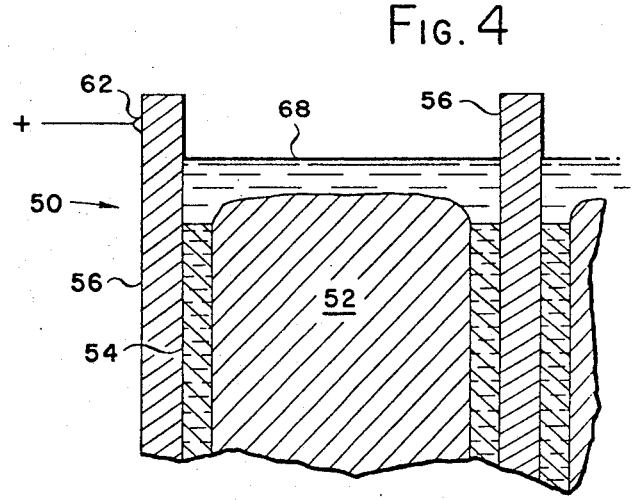
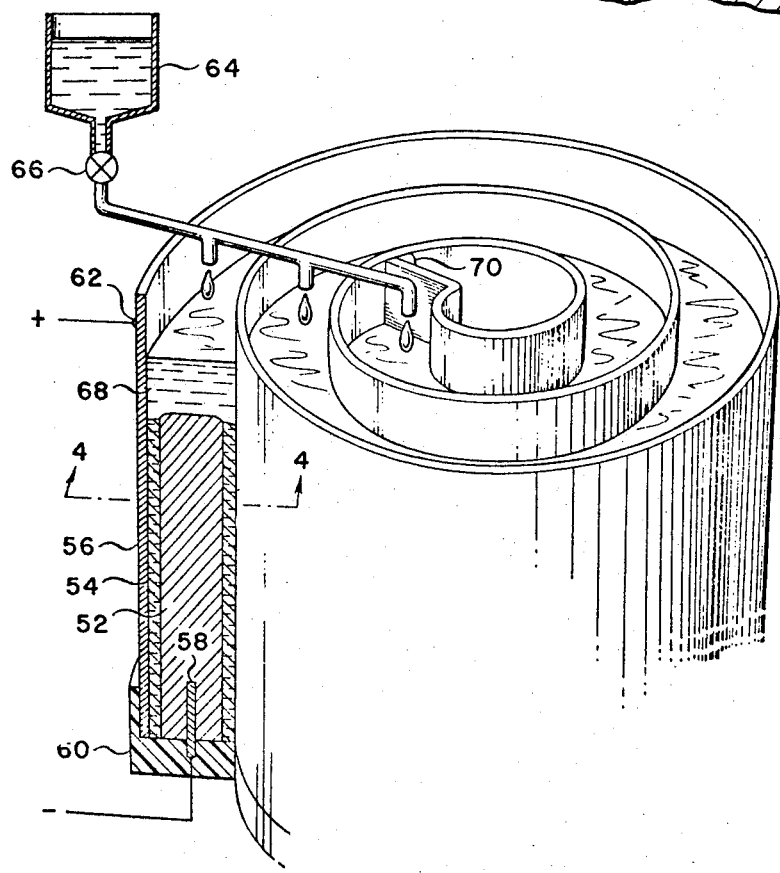
Fig. 3

PATENTED FEB 12 1974 3,791,871

SHEET 3 OF 3

ELECTROCHEMICAL CELL

The present invention relates to an improved means and method for generating electricity directly from the electrochemical reaction of alkali metals with water in a simple cell in a controlled alkali metal hydroxide electrolyte.

Fuel cell and battery art has previously taught the limiting necessity of separators, spacers, membranes, porous barriers, dynamic films, mercury amalgams, alloys with less active metals, nonaqueous electrolytes or high temperature molten salts between the cell electrodes to prevent electrical shorting and to prevent direct, violent chemical combinations where alkali metals were utilized. Examples are shown by U.S. Pats. Nos.: 1,015,734; 1,015,735; 2,605,297; 2,646,458; 3,014,084; 3,031,518; 3,236,694; 3,449,165; 3,471,335; 3,488,221; and 3,507,703. Another recent example is illustrated in a co-pending U. S. Patent application by Wilson S. Geisler, Ser. No. 8,606, filed Feb. 4, 1970, entitled "Electrochemical Energy Source", which utilizes moving mechanical components to provide a high output dynamic thin film alkali cell. These patents demonstrate over 65 years of technical efforts to make more effective use of alkali metals in batteries.

The above-cited Pat. No. 2,605,297 teaches that "...it is desirable to have a highly electropositive material as an electrode." "In the known art these electropositive properties have been found only in alkali metals and in alloys of alkali metals which are rapidly attached by water. The rapidity of such attack by water and the mechanical and physical properties such as strength and melting point has prevented the practical use of these materials for many purposes for which they are, otherwise, well suited; for example, electrodes in water activated primary cells, ..."

The above Pat. No. 1,015,734 filed in 1906 teaches that: "Since metallic sodium is decomposed by water and aqueous solutions of caustic soda it cannot be brought directly into contact with an electrolyte." The above recent Pat. No. 3,507,703 issued Apr. 21, 1970 still teaches that "...the direct single-step electrochemical oxidation of an alkali metal to obtain electrical energy is not feasible in an aqueous electrolyte because of the rapid reaction of the alkali metal with water, ..." "...the vigorous chemical reaction which occurs between an alkali metal and water requires the use of nonaqueous electrolytes in contact with the alkali metal."

In contrast to the above teachings, the present invention permits the safe and effective use of alkali metals with an aqueous electrolyte in a simple cell configuration which does not require moving parts, dynamic films or mechanical separators between the electrodes, or alloying or amalgamation of the alkali metals, and yet provides energy densities in the range of 330 watt hours per kilogram of anode material for sodium, and over 2,000 for lithium. The only consumed materials are the anode metal and water. The cell simplicity allows the total system weight to be not substantially greater than that of these consumed materials alone.

In the cell of the invention the anode can be entirely alkali metal. The electrolyte can be spontaneously locally generated by the reaction of the alkali metal anode with water to form an alkali metal hydroxide solution. The ability to use water to provide for the battery electrolyte is an important advantage, as emphasized by the U. S. Supreme Court in *United States v. Adams*, 383 U.S. 42; 148 U.S.P.Q. 479. Control of the electrolyte hydroxide concentration governs the rate of reaction of the water in the electrolyte with the anode metal to prevent anode melting and thermal runaway. The oxidizer can be untreated fresh or sea water or any other suitable aqueous solution. It is added continuously at an appropriate restricted rate to the electrolyte while electrical power is simultaneously drawn from the cell. The rate of this water addition is controlled to replace the water reduced and also maintain the electrolyte concentration balance. The cathode, at which the added water is electrochemically reduced, can be any suitable non-reactive conductive metal surface spaced from the anode. Thus, in the cell of the invention, electricity is generated safely and effectively from a highly active solid alkali metal anode and a simple cathode, both directly immersed in an appropriate, controlled aqueous electrolyte into which water is fed at an appropriate restricted rate.

The present invention allows the direct use in batteries of alkali metals which are good electrical and thermal conductors, light-weight, widely available, inexpensive, and can provide high energy densities. It allows their use with the available water in low cost, mechanically simple structures having good energy outputs per unit weight.

Further objects, features and advantages of the invention pertain to particular arrangements, structures and operations whereby the above-mentioned aspects of the invention are attained. The invention will be better understood by reference to the following description and to the drawings forming a part thereof, wherein:

FIG. 1 is an axial cross-sectional view of a first embodiment of an electrochemical cell in accordance with the present invention;

FIG. 2 is a cross-sectional view of the embodiment of FIG. 1 taken along the line 2—2 of FIG. 1;

FIG. 3 is a perspective view of a second embodiment of the present invention;

FIG. 4 is an enlarged partial cross-sectional view of the embodiment of FIG. 3 taken along the line 4—4 of FIG. 3;

Figure 5:
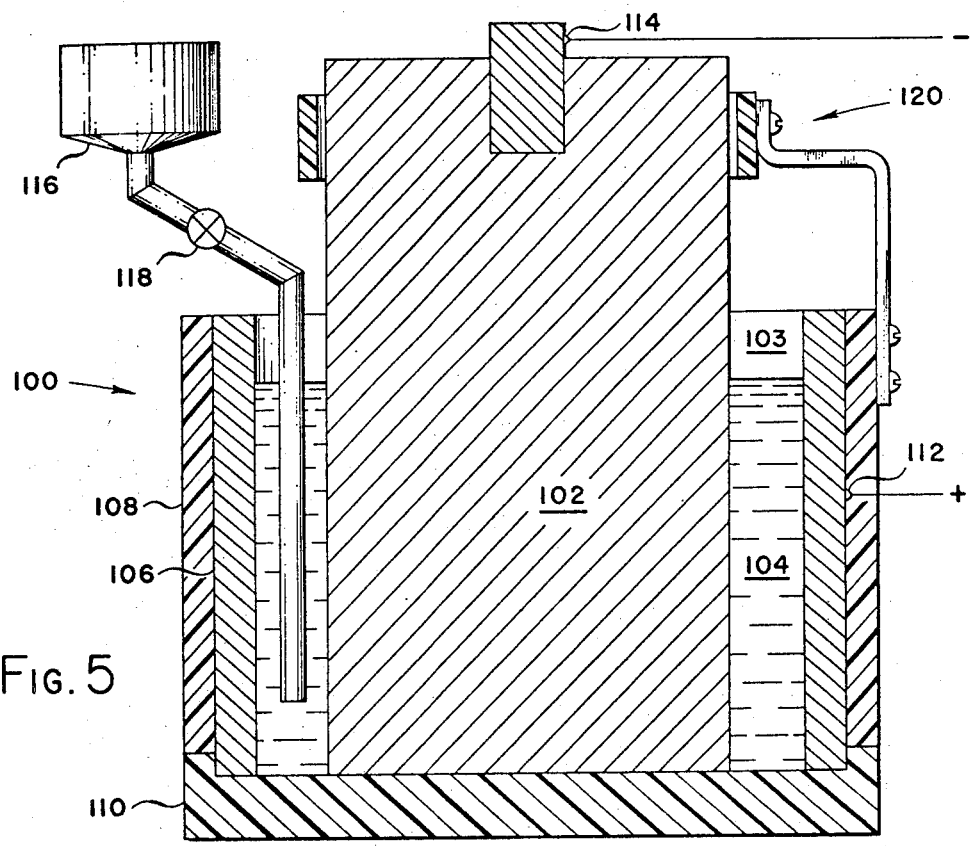
FIG. 5 is an axially cross-sectioned perspective view of a third embodiment of the present invention.

Referring first to FIGS. 1 and 2, there is shown therein a first exemplary battery cell 10 in accordance with the present invention. The discussion hereinbelow of the cell 10 of FIGS. 1 and 2 is also applicable to the subsequently described exemplary batteries or cells 50, 100, 150 and 200 of FIGS. 3, 4, 5, 6, and 7 respectively, except as to described differences.

The cell 10 includes a central alkali metal (sodium) anode cylinder 12 surrounded by an insulator/spacer of a thin film 14 of non-reactive, water soluble material which is not an electronic conductor. A preferred material for the film 14 is the natural hydrated oxide which forms on the sodium surface when it is exposed to humid air. Other suitable water soluble electrical insulators may be used for the film 14. Directly surrounding this film 14, and providing the cathode, is a non-reactive electrically conducting cylindrical tube 16, spaced from the sodium anode by the film 14. The cathode tube 16 may be covered with an outer envelope 18 of partially thermally-insulating material, such as plastic, if desired for certain applications.

Embedded in the sodium cylinder 12 is an electrical contact 20 which is fed through and sealed in a bottom insulating cap 22 to form the negative anode terminal of the battery. It is important to make a good electrical contact 20 with the sodium, preferably solidly embedding the contact wire into the sodium. The insulating base cap 22 here can be made of molded plastic or else the end of the cell 10 may be dipped in a suitable potting compound. The positive cathode terminal 24 is formed by any suitable electrical connection to the cathode tube 16.

An upper plastic cap 26 on the battery is apertured for the inlet of water 28 through a capillary aperture 30 and for hydrogen gas escape through a vent hole 32. A long shelf life may be obtained if the vent hole 32 is plugged with an only slightly permeable removable plug 38 such as cork or wood. A valve 34 is provided for admitting the water 28 into the cell at a controlled rate from a reservoir 36.

Referring to the film 14, when the natural hydrated oxide of sodium is to be employed it suffices to oxidize the sodium surface for 5 minutes in air. The surface-oxidize sodium cylinder 12 may then be inserted into a rigid concentric containing tube 16 to form a snug, but not tight, fit so that there is no metalic electrical contact between the sodium and the tube 16. Alternatively, the tube 16 may be formed around the surface-oxidized sodium cylinder 12 by rolling metal foil around the cylinder 12 and applying a suitable sealer at the seam, for example, an epoxy, which, if applied completely around the tube 16, can also serve as the thermal insulator 18 and the cell container.

A space at least one-half the volume of the sodium 12, plus a small additional distance is provided between the top of the sodium and the bottom of cap 26 initially to allow for the reaction product 40 (hydrated sodium hydroxide) to accumulate and also to afford some small gas space below the cap 26. Alternatively, an aperture in the side of the cell may be provided for excess electrolyte removal during the cell's operation.

When the battery is operated, the water 28 is admitted through the small aperture 30 by the valve 34 at a slow controlled rate which must be matched to the thermal and electrical loads on the battery in order to keep the internal operating temperature within appropriate limits. The aqueous solution 28 may be fed from the reservoir (container) 36 or the entire battery may be submerged in fresh water or sea water. It will be appreciated that the valve 34 may be eliminated and the proper controlled rate of water input may be achieved through use of an appropriately sized capillary tube 30 or wicking arrangement. A sufficiently small fixed aperture or a plurality thereof may be used for water flow rate control in place of the valve 34. The electrolyte is an aqueous solution of an appropriate concentration of the reaction product 40 formed in the cell 10 as the water 28 is added.

The plug 38 may be removed automatically by the action of internally generated hydrogen gas pressure in the following manner. The valve 34 is opened briefly to admit a few drops of water and is then closed. The hydrogen generated internally by the reaction will push out the plug 38. Subsequent opening of the valve 34 by an appropriate amount will assure operation of the battery. Alternatively, the plug 38 (if initially present) may be removed by hand and the proper setting of valve 34 made prior to filling of the reservoir 36 or submersion of the battery. Various conventional simple spring-loaded automatic valves may be used in place of the plug 38.

The battery diameter, length, thickness of thermal insulation 18, valve 34 setting and/or capillary 30 diameter can be varied to provide for the intended use in terms of electrical load, duration of discharge and intended environment. If the electrical power demand is always less than the maximum designed rating of the battery in the design environment then considerable flexibility is afforded through use of the valve 34. An appropriate water inlet rate may be readily established empirically which will result in a satisfactory internal operating temperature, and electricity (at rates below the maximum power rating) may then be drawn at the level needed, albeit at varying overall energy conversion efficiencies.

Tube 16 internal diameters of between 0.5 and 6.0 centimeters have been operated satisfactorily and there seems to be no limitation on the use of larger battery diameters, with proper design. With a tube 16 internal diameter of 1.27 cm., in operation in room temperature air with no thermal insulation 18, a maximum steady-state power output of 2 watts was achieved. This observed power output was nearly independent of battery length, provided the length exceeded several centimeters.

A critical design consideration is to limit the maximum rate at which water can enter the cell. Flooding of the battery with water will cause a thermal runaway, and usually an explosion. Sufficient excess water in the electrolyte will cause a rise in internal temperature above 97.5°C, which is sufficient to melt the sodium mass. When the sodium melts, an immediate increase in its reaction rate with the electrolyte occurs, resulting in an explosion. On the other hand, too great a heat loss from the battery, as when the battery is without any thermal insulation 18 and is immersed in ambient temperature water or other cooling liquid, results in excessively low electrical power output because the internal temperature remains below that necessary to liquify the sodium hydroxide electrolyte. For these reasons the effective thermal conductivity of the battery walls must be tailored to the environment of application and the desired power output.

Considering the apparent scientific theory of operation involved, it is known that water first enters the battery and dissolves the upper portions of the soluble film 14 and makes some hydrated sodium hydroxide plus heat. While the temperature is low the product formed is a solid with very low mobility of water molecules and ions. When the temperature becomes sufficient to liquify the hydrated sodium hydroxide, and thereby provide a liquid electrolyte, useful electrical power is obtained. It is believed that the water molecules directly adjacent to the sodium surface at any instant are immediately consumed by direct chemical action, thereby establishing a protective film and a concentration gradiant (concentration polarization) across which water molecules must diffuse before further chemical reaction can occur at the sodium/electrolyte interface. However, water molecules at the cathode 16 can be reduced electrochemically to hydrogen gas and hydroxide ions by the electrons supplied from the sodium through a closed external circuit. The high mobility of the hydroxide ions produced near the cathode favors their migration away from their point of origin and presents less restriction to the continued migration of water molecules toward the cathode than toward the polarized anode. There is no electrochemical requirement for water molecules to reach the anode surface, only hydroxide ions, because the anode metal ions can readily enter the electrolyte, even at a water-starved anode/electrolyte interface. Therefore, the combination of: (1) the diffusion barrier for water at the anode; (2) the provision for electron transfer at high rates from the anode to the cathode through a low impedence external circuit; (3) the low ohmic resistance of the electrolyte; and (4) the restricted rate of water addition to the electrolyte all make possible a continuous selective favored migration of the water molecules towards the cathode. This makes possible the realization of high coulombic efficiencies without recourse to selective porous barriers, membranes or the like.

Therefore, it may be seen that without the insertion of barriers, when sufficient high current densities are drawn from the cell to lower its voltage substantially below the open circuit voltage, preferential diffusion of water to the cathode is favored. For example, in typical experiments the coulombic efficiency was 20 percent at a cell voltage of 1 volt under load, but increased to above 60 percent at ¼ volt. Thus, over half of the water molecules involved in the chemical and electrochemical (versus hydration) reactions in the cell were being reduced at the cathode when high currents (at low voltages) were drawn.

The relationship of internal temperature to the functional factors given above is best understood in terms of electrolyte composition. For this purpose, for a sodium anode cell the phase diagram for sodium hydroxide and water given in Mellor's standard text *A Comprehensive Treatise on Inorganic and Theoretical Chemistry*, Volume 2, Supplement 2, page 502 (1961) is most helpful. These data are provided in FIG. 8, where the operating region is indicated by the shaded area 300 with the preferred operating point 302 located therein. From this phase diagram it is readily seen that between the temperatures of 50°C and 97°C a homogenous liquid exists between sodium hydroxide and water for concentrations as great as 60 percent by weight sodium hydroxide at 50°C, with higher concentrations as the temperature increases above 50°C. The preferred concentration of 70 percent by weight sodium hydroxide is a solution above 65°C. This is approximately 30 molar sodium hydroxide and corresponds to the liquid sodium hydroxide monohydrate.

Figure 8:
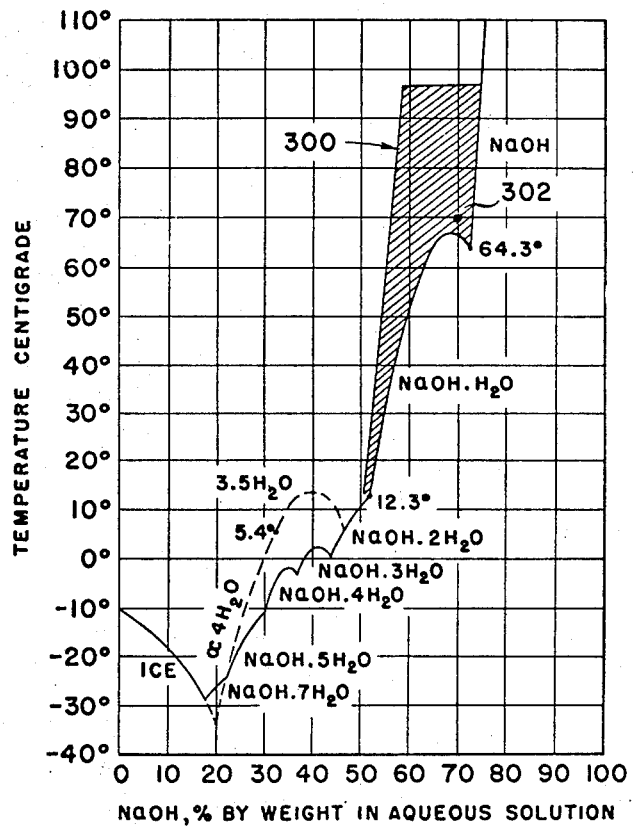
FIG. 8 is a diagram showing the operating region for a sodium anode and sodium hydroxide solution electrolyte.

The shaded area 300 in FIG. 8 indicates the range of steady-state electrolyte compositions which can provide adequately stable operating conditions for cells utilizing sodium anodes. As may be seen, the area 300 is roughly triangular, being bounded on the left side by a line established empirically from determinations of the maximum amounts of water safely allowable in the electrolyte at various temperatures. The area 300 approaches an upper boundary set by the melting temperature of sodium. On the right, area 300 approaches the liquid/solid boundary. This boundary is formed by the liquid/solid curve for sodium hydroxide monohydrate ($NaOH \cdot H_2O$) and the liquid/solid line for sodium hydroxide ($NaOH$). It is to be understood that the closeness of this approach to the liquid/solid limiting boundary is constrained by two requirements. The first of these requirements is that solidification of the electrolyte is to be prevented during operation of the cell. In experiments it was observed, for example, with a battery operating with a liquid electrolyte composition of 70 percent by weight sodium hydroxide, that when the internal temperature was allowed to drop below 65°C there was a sharp increase in the internal resistance of the battery, because the electrolyte solidified, conforming to FIG. 8. The second of the above two requirements is that sufficient water molecules must be present in the electrolyte to support the cathode partial reaction, as required for a net electrical power output from the cell.

Therefore, the electrolyte must remain at a temperature below the melting point of the alkali metal anode and not in excess of the boiling point of the electrolyte. Furthermore, for the sodium/water system, it may be seen that the electrolyte composition operating regime corresponds approximately to the composition of the liquid sodium hydroxide monohydrate which is 70 percent sodium hydroxide by weight.

Pertaining to the amount of water which must be added to satisfy stoichiometric requirements of the reactions involved in operating the battery, it is readily seen that approximately two water molecules are needed for each atom of sodium consumed. One of these water molecules is required to transform sodium to sodium hydroxide (whether by direct chemical or by electrochemical reaction), and the second water molecule is necessary to form the monohydrate of the sodium hydroxide for the reasons given above.

As one practical way of determining the maximum acceptable cell water inlet rate, it is sufficient to measure the volume evolution rate of hydrogen from an operating cell. From this measurement the number of moles of hydrogen evolved per second is readily calculated. The maximum number of moles of water needed per second is just four times the number of moles/sec of molecular hydrogen evolved. Water added in excess of this rate will either raise the temperature to the danger point or, if sufficient cell or anode cooling is available to hold the temperature below 97°C, then the sodium hydroxide concentration will drop, due to dissolved but unreacted water accumulation in the electrolyte, until the reaction rate and heating eventually exceed the cooling capacity. In either case an explosion is the likely result.

When the water inlet is closed, excess water in the electrolyte reacts with sodium at a rate which tends to decrease with the water content. Correspondingly, the heat evolution rate decreases and the internal temperature drops until the electrolyte solidifies. At this point the reaction stops for practical purposes and the battery is inactive until water is added. Thus the system is easily regulated by the water supply rate, provided that this rate remains below the above-discussed maximum limitations.

Accordingly, the sodium cell 10 is self-protecting and soon becomes inactive when no further water is allowed to enter the cell. The electrolyte solidifies, and no significant internal reaction is then possible until more water is added from an external source. Yet the system may be activated simply by adding water, which migrates sufficiently to start the reactions and generate heat. Activation is largely independent of the ambient temperature, and no activating chemicals or processing are required. Any and all heat required to achieve the desired operating condition may be provided simply by the exothermic reaction in the cell. Thus, low ambient temperature and the presence of solid electrolyte in the cell does not hinder its activation, and the cell quickly operates stably at near-room temperatures. Cells can be designed for a start-up time of a few seconds or less if fast start-up is desired.

In summary, the necessity for achieving a set of interrelated conditions for useful, efficient and safe operation of a sodium/water system as a battery is apparent from the discussion above. The structure and method of the invention satisfies these interrelated conditions to achieve useful electrical power extraction from an otherwise violent reaction of an alkali metal and water. Rather than reducing the activity of the alkali metal anode by amalgamating it or alloying it with a high percentage of a less active metal (as was previously believed necessary in order to directly engage the alkali metal anode with an aqueous electrolyte without thermal runaway), the present cell enables the direct utilization and total immersion of the active solid alkali metal itself as an anode, by limiting the activity of the aqueous electrolyte. This limitation of the electrolyte activity is accomplished through restriction of the rate at which water molecules can arrive at the anode metallic surface. A high electrical power output is provided by the continuous introduction of only a restricted quantity of water during the operation at a rate which maintains the electrolyte hydroxide concentration and replaces the water consummed. The water required is the water reduced electrochemically at the cathode, plus the water consummed by direct chemical reaction with the anode, plus the hydration/dilution requirement to meet the increases in the amount of hydroxide in the electrolyte.

Referring next to FIGS. 3 and 4, there is shown therein a second exemplary battery 50 in accordance with the present invention. FIG. 4 is a cross-section taken from FIG. 3 along the direction 4—4. The cell 50 has a spiral configuration. It consists of a sheet of alkali metal (sodium) anode 52, a thin electrically insulating film of soluble material 54 (such as the oxide layer described previously), a sheet metal cathode 56, a terminal 58 embedded in the alkali metal anode material 52, a lower plastic cap or potting compound seal 60, a cathode terminal 62, a water supply means 64 for supplying water to the electrolyte at a controlled rate through valve 66, an electrolyte 68, and suitable vertical end seals such as the inner seal 70 shown to retain the electrolyte in the cell 50.

The exemplary closed spiral configuration of the cell 50 illustrates the use of both sides of a sheet metal surface as part of the cathode 56 area. Thus, the two active surfaces of the cathode 56 shown in FIG. 4 represent two turns in the same continuous sheet of metal.

It will be understood that as an alternative to the single continuous cathode arrangement shown in FIGS. 3 and 4 that two separate parallel sheet metal cathodes may be placed on opposite sides of the anode 52, to form a flat plate construction, or to be similarly rolled up in the form of an open or closed spiral. This form requires more space and material but provides increased external cathode surfaces available for external cooling and also lends itself to the series connection of cells for voltage addition.

Advantages afforded by thin flat plate or spiral cell constructions, of which the embodiment 50 is exemplary, are their compactness and ease of construction and assembly. For example, a sheet of sodium may be easily rolled out as a continuous ribbon of the desired thickness, air oxidized as described previously, and then laid on, and rolled up within, a thin metal sheet to form the body of the battery as shown in FIG. 3.

Referring next to FIG. 5, there is shown therein a third exemplary battery 100 in accordance with the present invention. The cell 100 here consists of a central cylindrical solid sodium metal anode 102 surrounded by an annular space 103 between the anode and an enclosing cylindrical cathode wall container 106. This space 103 is preferably initially charged with a water-depleted electrolyte 104 which is solid sodium hydroxide monohydrate. Provision is made for thermal insulation 108 as needed, and for a bottom seal 110. The cathode is contacted by the positive terminal 112, while the anode 102 contains a suitably embedded negative terminal 114. Water is supplied at a controlled rate by gravity feed from a container 116 through a valve 118 down through a tube extending down into the electrolyte to near the bottom of the cell. The anode 102 is considerably longer than the depth of the container 106 here in order to provide a continuous gravity feed of anode material into the cell as the anode metal is consumed by the cell reactions. An insulating collar and support mechanism 120 is therefor provided to hold and guide the anode metal down into the center of the cell.

A principal advantage of the configuration exemplified by the cell 100 is the versatility afforded by the use of large diameter anodes with variable anode feed rates and with relatively gross spacing between the anode metal and the cathode compartment walls. As excess electrolyte forms during operation, it can run over the top of the cathode wall 106, or leave through an appropriate exit port provided in the side wall of the container, or be removed and stored in containers provided for its accumulation. The anode metal feed rate is slow, and the cell operates in the same general manner as the other disclosed static cells.

As an example of the configuration exemplified by the cell 100, it was found convenient in an experiment to use a standard commercial cylindrical billet of sodium (0.45 kg., 5.8 cm. diameter) taken directly from its shipping can as the anode 102, with a cathode container 106 consisting of a 6.0 centimeter internal diameter stainless steel beaker (321 alloy) 14 centimeters deep to support and guide the sodium billet, and a small (1 millimeter inside diameter) water feed tube of plastic inserted down the side wall in the space 103 to approximately the bottom of the stainless steel beaker. The electrolyte composition was held at approximately 70 percent by weight sodium hydroxide through a controlled water input rate of 0.5 milliliters per minute. For this test the electrolyte temperature was maintained at approximately 75°C by a water cooling coil soldered on the bottom exterior surface of the beaker 106. With this simple cell, 130 grams of sodium anode was consumed while simultaneously withdrawing electrical power at an average rate of 3.0 watts at 0.6 volt in a 400 minute test run with a constant anode immersion depth of only 1.0 centimeter in the electrolyte, maintained by two overflow holes in the side of the beaker one centimeter above the bottom.

Lithium was used as the anode material in a similar test apparatus which was immersed in a constant temperature bath to provide a desired temperature level control of the electrolyte. A cylindrical lithium anode, 1 centimeter in diameter, was immersed to a constant depth of 2 centimeters in the electrolyte, said constant depth being maintained by overflow of excess electrolyte as it was produced in the cell. The cell was operated at 1 volt, with a water input rate of 1 milliliter per minute for the following steady state values: with the electrolyte temperature maintained at 15°C and a power output of 1 watt, 5.3 miligram per minute of lithium was consumed, and the electrolyte was approximately 0.75 molar lithium hydroxide; with the electrolyte temperature maintained at 60°C and a power output of 1.2 watt, 10 miligram per minute of lithium was consummed with an average electrolyte concentration of approximately 1.5 molar lithium hydroxide.

It is apparent that the rate of reaction between lithium and dilute aqueous solutions is much lower than is the case with sodium. The tenacious surface film of lithium hydroxide which forms on the lithium anode is presumably more effective in reducing the flux of water molecules to the anode than is the case with sodium. Consequently, in contrast to sodium, lithium can achieve relatively high efficiencies (in terms of watt hours per pound of anode metal consumed) when immersed in relatively more dilute aqueous solutions than sodium without melting, due to a higher point of lithium and its less soluble surface film. As a result, the volume of electrolyte produced per unit volume of lithium consumed in this operating mode is much larger than the 50 percent increase in electrolyte volume associated with the conversion of sodium to the sodium hydroxide monohydrate electrolyte described above. From the values given above for lithium, for example, it is seen that 1 cubic centimeter of lithium consummed at 15°C results in a solution of 0.75 molar lithium hydroxide whose volume is approximately 0.1 liter, or a 100 fold volume increase to maintain the same solution. The electrolyte can be somewhat more dilute than 0.75 molar in lithium hydroxide but not so dilute that the electrolyte ohmic resistance becomes a serious limitation on the cell power. An absolute upper limit on electrolyte concentration is the saturation limit of solubility in water, which for lithium hydroxide is known from the literature to be far below that for sodium hydroxide. As a practical matter an electrolyte concentration well below the hydroxide solubility limit is desirable to assure adequate transport rates of water molecules to the cathode. Thus for lithium, means are preferably provided for hydroxide solution removal from the cell during its operation as discussed previously. Also, it can be appreciated that continued exposure of lithium to a dilute electrolyte in the cell will continue to consume the lithium even after the water feed is stopped, as the water is in considerable stoictiometric excess, in contrast to sodium cells with their high molarity electrolytes. Therefore, in the case of lithium, when electrical power is no longer needed the electrolyte or the anode should be removed from the cell if the remaining lithium is to be saved for future use.

Water can be reclaimed from the aqueous lithium hydroxide electrolyte product, for example, by bubbling carbon dioxide therethrough and removing through precipitation the resulting insoluble lithium carbonate. Various uses can be envisioned for this well known property of lithium to trap carbon dioxide and to form an insoluble carbonate.

For other active alkali metal anode metals, including alloys, it will be appreciated that those skilled in the art, using the teachings provided herein, can determine their appropriate electrolyte concentrations, water feed rates and operating temperatures by careful routine experimentation.

Cell cooling means can be provided in a variety of ways besides the air cooling and water immersion cooling shown. For example, an ethyl alcohol reservoir will control the temperature at essentially 78°C, its boiling point. An alcohol heat pipe in good thermal contact with the anode may be employed as another means for cooling and stabilizing the cell operating temperature.

It will also be appreciated that a suitable gas trap around the cell, comprising a sliding seal, double wall enclosure, or other suitable conventional arrangements, may be used for collecting and utilizing the hydrogen liberated by the cell reactions. The evolved hydrogen is a useful product which, for example, can be directly used in fuel cells or engines to provide substantial additional power and useable water if desired. Alternatively, the hydrogen can be directly immediately disposed of in a simple conventional platinum catalytic burner. The heat therefrom can be used for a steam engine or other purposes. The evolved hydrogen can also be consumed electrochemically in the cell by a suitable oxidizing agent, if desired.

Individual electrode polarization measurements conventionally taken with a suitable reference electrode inserted in the electrolyte between the anode and the cathode have shown that essentially all cell polarization occurs at the anode. Thus, the depth of immersion of the anode in the electrolyte can serve as a control over cell activity and output power. The evolved hydrogen may be used to control the anode immersion depth or electrolyte level to provide a self-regulating power mechanism. For example, a sealed bellows arrangement pressurized by the evolved hydrogen, linked to the anode and provided with a bleed valve can couple the hydrogen evolution rate to the extension of the bellows and therefore to the anode immersion depth which, in turn, will control the power output of the cell. The same or a similar arrangement may be used to control the water supply rate, that is, extension of the bellows may control the degree of opening of the water valve.

Figure 6:
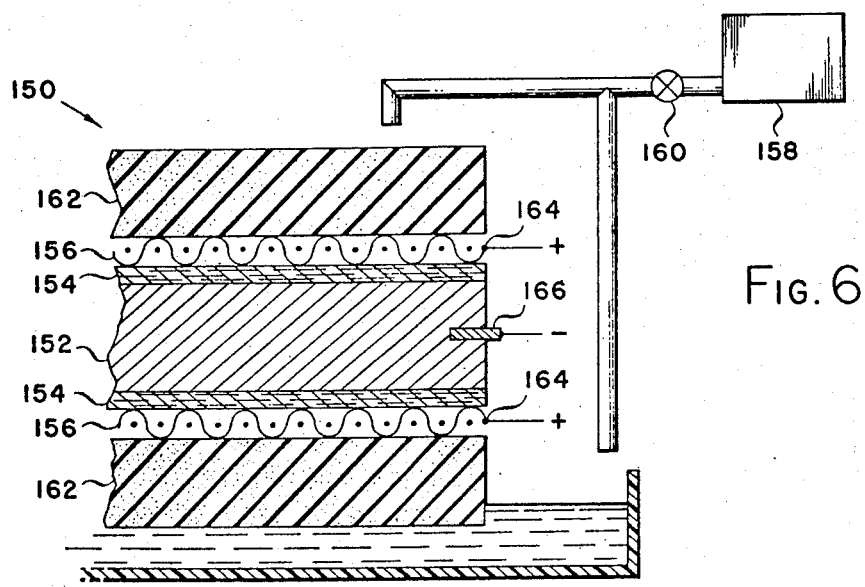
FIG. 6 is a cross-sectional view of a fourth embodiment of the present invention.

Referring next to FIG. 6 there is shown therein a fourth exemplary battery 150 in accordance with the present invention. The cell 150 consists of a sodium anode 152, a layer of soluble material 154, such as the alkali metal hydrated oxide formed in air described previously, an open-mesh metallic screen 156 which is in contact with soluble material 154 but which does not make metallic contact with the anode 152, a water supply means 158 with a control valve 160, a porous material or sponge 162 in contact with the metal screen 156, a positive cathode contact 164 to the metal screen 156, and a suitable anode contact 166 forming the negative terminal of the cell.

The sponge material 162 is unnecessary to distribute the water uniformly over the metal screen 156 when a capillary wicking type screen is used. In that case it suffices to drip or wick water anywhere onto the screen at a limited rate.

An advantage of the screen cell 150 embodiment is the facility it provides for hydrogen escape and for various uncritical rate means of water supply, for example mist or steam or fog in contact with the large working area exposed by the screen cathode. The cell 150 can operate at low power densities solely from humid air such as is present in jungle atmospheres. In such cases a separate water supply means is unnecessary.

Figure 7:
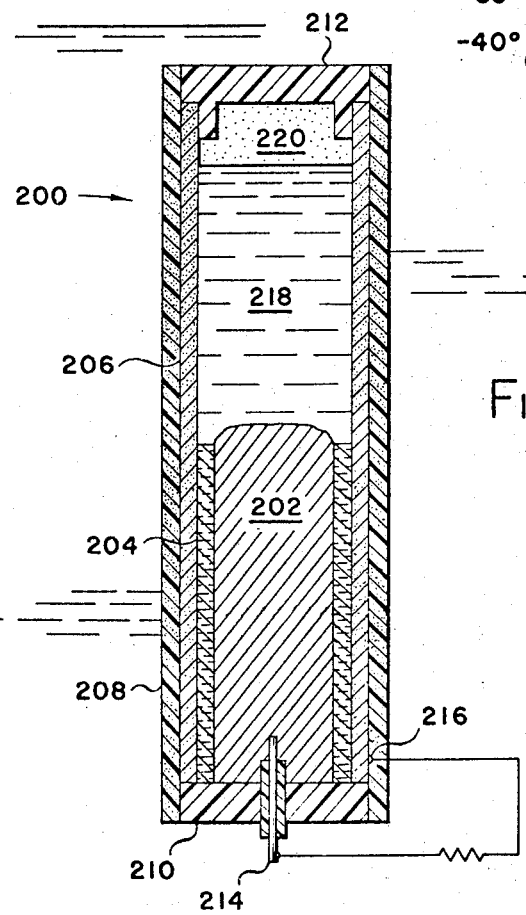
FIG. 7 is an axial cross-sectional view of a fifth embodiment of the present invention, fully submerged in water.

Referring next to FIG. 7, there is shown therein a fifth exemplary battery 200 in accordance with the present invention. The cell 200 consists of an alkali metal (sodium) anode 202 surrounded initially by a thin film of soluble material 204 as described previously, a porous metal jacket 206 which serves as a cathode, a porous thermal insulation jacket 208, an insulating base cap 210 of molded plastic or potting compound, an embedded anode terminal 214, a positive cathode terminal connection 216, an electrolyte 218 which forms during cell operation, a gas space 220 to accommodate internal volumetric expansion associated with product formation, and a top cap 212 of plastic or any suitable sealing material.

The primary difference between this cell 200 of FIG. 7 and the cell 50 of FIG. 1 is the use in the cell 200 of porous wall materials whose purpose is to provide automatically controlled ingress of water from an underwater environment into the cell, and automatic gas egress. The cell 200 is intended primarily for submerged or immersed operation for use in oceans, lakes, rivers, etc.

It has been found that the porosity of the wall and jacket materials and the thickness of the thermal insulating jacket can be adjusted to provide satisfactory operation in a fully submerged condition with hydrogen gas leaving the cell through the porous walls as it is produced by the reactions. A further advantage for submerged operation of the cell 200 is its relative insensitivity to orientation. A further modification may be provided, namely, addition of a vent in cap 212 which facilitates the escape of hydrogen during operation. The selection of an appropriate diameter for the gas vent will prevent entrance of water therethrough because the capillary forces in the porous walls are greater than in the vent tube. This has the effect of insuring preferential entrance of liquid water through the porous walls and exit of hydrogen gas through the vent tube.

Additional advantages accrue from the use of porous metal walls 206. For example, it is unnecessary to provide the film 204 in advance in this case, because the initial water attack through the side walls will consume the alkali metal at the interface and isolate the anode 202 electronically from the cathode, even if internal shorting is initially present.

A long shelf life may be obtained through application of an external water-soluble coating or package around the cell or by storage in a removable hermetic plastic bag.

It may be seen that there has been disclosed herein a novel electrochemical cell. It is contemplated that numerous variations and modifications may be made therein by those skilled in the art. The following claims are intended to cover all such variations and modifications as fall within the true spirit and scope of the invention.

What is claimed is:

1. An electrochemical cell comprising:
   a solid elemental alkali metal consummable anode which is highly reactive with water;
   a non-reactive electrically conductive cathode spaced from said anode;
   a container of liquid electrolyte in which said alkali metal anode and said cathode are commonly directly immersed as a static cell;
   said cell providing an open and unimpeded liquid electrolyte circulation path between said anode and said cathode;
   circuit connection means at said cathode and said anode for drawing electrical power from said cell;

said electrolyte in the operation of said cell consisting essentially of a liquid solution in water of the hydroxides of said alkali metal anode;
   said electrolyte having a liquification temperature substantially below the melting point of said alkali metal anode;
   said hydroxide solution of said electrolyte being of sufficiently high concentration to restrict the direct chemical reaction rate between said alkali metal anode and the water in said electrolyte at said alkali metal anode to prevent both melting of said anode and boiling away of said electrolyte;
   and electrolyte molarity control means for continuously controlling said hydroxide solution concentration of said electrolyte as said cell is operated to maintain said electrolyte at a temperature below the melting point of said alkali metal anode and not in excess of the boiling point of said electrolyte.

2. The electrochemical cell of claim 1 wherein said control means comprises water feed control means for continuously feeding additional water into said electrolyte at a controlled restricted rate in a manner whereby a portion of said water diffuses through said electrolyte to said cathode to be reduced electrochemically at said cathode as electrical power is drawn from said cell by said circuit connection means.

3. The electrochemical cell of claim 1 wherein said anode is sodium and said alkali metal hydroxide is sodium hydroxide and wherein said solution thereof corresponds approximately to the composition of sodium hydroxide monohydrate.

4. The electrochemical cell of claim 1 wherein said anode is sodium and said alkali metal hydroxide is sodium hydroxide and wherein said solution is approximately 70 percent sodium hydroxide by weight.

5. The electrochemical cell of claim 2 wherein said anode is lithium and said alkali metal hydroxide is lithium hydroxide.

6. The electrochemical cell of claim 1 wherein said water feed means comprises a water supply means and water flow restricting aperture means between said water supply means and said electrolyte.

7. The electrochemical cell of claim 1 wherein said anode and said electrolyte are enclosed in a porous-walled container providing restricted water ingress and restricted hydrogen gas egress.

8. A method of generating electricity in an electrochemical cell comprising:
  directly commonly immersing a solid alkali metal anode highly reactive with water and a non-reactive cathode in an electrolyte consisting essentially of a liquid solution in water of the hydroxides of said alkali metal anode;
  maintaining said electrolyte at an operating temperature above its liquification temperature and below the melting point of said alkali metal anode and not in excess of the boiling temperature of said electrolyte;
  maintaining said hydroxide solution of said electrolyte at a sufficiently high concentration to prevent melting of said anode by the direct chemical reaction between said anode and the water in said electrolyte;
  and continuously adding water to said electrolyte at a restricted rate which maintains said electrolyte hydroxide solution and replaces the water consummed in the cell by the chemical and electrochemical reactions therein while electrical power is simultaneously withdrawn from between said anode and said cathode.

9. The method of claim 8 wherein said anode is sodium and said electrolyte hydroxide is sodium hydroxide and wherein said operating temperature is maintained above 12.3°C and below 97.5°C and said sodium hydroxide electrolyte solution is maintained above 52 and below 75 percent by weight.

10. The method of claim 8 wherein said anode is sodium and said electrolyte hydroxide is sodium hydroxide and wherein said operating temperature is maintained above 65°C and below 97.5°C and said sodium hydroxide electrolyte solution is maintained at approximately 70 percent by weight.

11. The method of claim 8 and including adding water to said electrolyte by passing water through a porous-walled container at a restricted rate.

12. An electrochemical cell comprising:
  a. a solid elemental alkali metal consummable anode which is higly reactive with water;
  b. a non-reactive electrically conductive cathode spaced from said anode;
  c. an electrolyte in which said alkali metal anode and said cathode are commonly directly immersed as a static cell;
  d. said cathode being shaped so as to contain said electrolyte;
  e. said cell providing an open and unimpeded liquid electrolyte circulation path between said anode and said cathode;
  f. circuit connection means at said cathode and said anode for drawing electrical power from said cell;
  g. said electrolyte in the operation of said cell consisting essentially of a liquid solution in water of the hydroxides of said alkali metal anode;
  h. said electrolyte having a liquification temperature substantially below the melting point of said alkali metal anode;
  i. said hydroxide solution of said electrolyte being of sufficiently high concentration to restrict the direct chemical reaction rate between said alkali metal anode and the water in said electrolyte at said alkali metal anode to prevent both melting of said anode and blowing away of said electrolyte; and
  j. electrolyte molarity control means for continuously controlling said hydroxide solution concentration of said electrolyte as said cell is operated to maintain said electrolyte at a temperature below the melting point of said alkali metal anode and not in excess of the boiling point of said electrolyte.

13. The electrochemical cell of claim 12 wherein said control means comprises water feed control means for continuously feeding additional water into said electrolyte at a controlled restricted rate in a manner whereby a portion of said water diffuses through said electrolyte to said cathode to be reduced electrochemically at said cathode as electrical power is drawn from said cell by said circuit connection means.

14. The electrochemical cell of claim 13 wherein said anode and said cathode each have a substantially spiral configuration so that said spiral anode is positioned within said spiral cathode.

15. The electrochemical cell of claim 7 wherein said cathode is an open-mesh metallic screen.

* * * * *